(12) United States Patent
Deng et al.

(10) Patent No.: US 9,970,153 B2
(45) Date of Patent: May 15, 2018

(54) ROOFING PRODUCT WITH INCREASED TEAR STRENGTH COMPRISING A RELEASE AGENT

(75) Inventors: Yong Deng, Chongqing (CN); Pascal Commercon, Highlands Ranch, CO (US); Albert George Dietz, III, Littleton, CO (US)

(73) Assignee: Johns Manville, Denver, CO (US)

( * ) Notice: Subject to any disclaimer, the term of this patent is extended or adjusted under 35 U.S.C. 154(b) by 1485 days.

(21) Appl. No.: 12/384,602

(22) Filed: Apr. 7, 2009

(65) Prior Publication Data

US 2010/0255743 A1    Oct. 7, 2010

(51) Int. Cl.
*D06N 5/00* (2006.01)
*B32B 17/02* (2006.01)
*E04D 1/22* (2006.01)

(52) U.S. Cl.
CPC .............. *D06N 5/00* (2013.01); *B32B 17/02* (2013.01); *E04D 1/22* (2013.01); *Y10T 442/2992* (2015.04)

(58) Field of Classification Search
CPC ........... D06N 5/00; B32B 11/10; B32B 17/04; B32B 2383/00; B32B 2395/00; B32B 2419/06
USPC ................... 442/50, 58, 86, 87, 180; 52/518
See application file for complete search history.

(56) References Cited

U.S. PATENT DOCUMENTS

| | | | |
|---|---|---|---|
| 4,112,174 A | | 9/1978 | Hannes et al. |
| 4,248,936 A | * | 2/1981 | Marzocchi et al. ........... 428/391 |
| 4,681,802 A | | 7/1987 | Gaa et al. |
| 4,804,696 A | * | 2/1989 | Jolitz et al. ..................... 524/68 |
| 4,810,576 A | | 3/1989 | Gaa et al. |
| 6,248,271 B1 | * | 6/2001 | Graham .................... B22C 9/06 249/112 |
| 6,544,911 B2 | * | 4/2003 | Peng et al. .................... 442/157 |
| 6,993,876 B1 | | 2/2006 | Peng et al. |
| 7,905,067 B2 | * | 3/2011 | Schiffmann ........... B29C 70/443 52/169.9 |

* cited by examiner

*Primary Examiner* — Andrew Piziali
(74) *Attorney, Agent, or Firm* — Robert D. Touslee

(57) ABSTRACT

The present invention provides a roofing product comprised of an asphalt coating on a nonwoven fiberglass mat. Enhanced tear strength for the roofing product, generally an asphalt shingle, is obtained by the presence of a release agent. The release agent can be a coating on the fiberglass mat, an additive in the mat binder, or present as an additive in the asphalt itself. Preferably, the release agent is a reactive polysiloxane which can react with any component within the roofing product, including the glass surface, sizing chemicals, binder chemicals, as well as the asphalt coating. The reaction can take place either during or after the polysiloxane is added or applied.

7 Claims, No Drawings

ROOFING PRODUCT WITH INCREASED TEAR STRENGTH COMPRISING A RELEASE AGENT

BACKGROUND OF THE INVENTION

Field of the Invention

The present invention relates to roofing products exhibiting enhanced tear strength. More particularly, the present invention relates to non-woven glass fiber mats used to reinforce roofing products, with the products comprising a release agent, preferably a reactive polysiloxane.

Description of the Related Art

It is known to make reinforcing mats from glass fibers and to use these mats as substrates in the manufacture of a large number of roofing products such as shingles, built up roofing products, etc. Any known method of making nonwoven mats can be used, such as the conventional wet laid processes described in U.S. Pat. Nos. 4,112,174, 4,681,802 and 4,810,576, the disclosures of which are incorporated herein by reference. In these processes a slurry of glass fiber is made by adding glass fiber to a typical white water in a pulper to disperse the fiber in the white water forming a slurry having a fiber concentration of about 0.2-1.0 weight %, metering the slurry into a flow of white water and depositing this mixture on to a moving screen forming wire to dewater and form a wet nonwoven fibrous mat.

This wet nonwoven mat of glass fiber is then transferred to a second moving screen and run through a binder application saturating station where an aqueous binder mixture, such as an aqueous urea formaldehyde (UF) resin based binder mixture in water with about 24 weight percent, based on the dry weight of the UF resin, of a blend of 91.7 weight percent polyvinyl acetate homopolymer and 8.3 weight percent of an acrylic tripolymer, is applied to the mat. This is followed by sucking off the excess binder and drying the unbonded, wet mat and curing (polymerizing) the UF based resin binder which bonds the fibers together in the mat. Preferably, the aqueous binder solution is applied using a curtain coater or a dip and squeeze applicator, but other methods of application such as spraying will also work.

In the drying and curing oven the mat is subjected to temperatures of 250-450 or 500° F. for periods usually not exceeding 1-2 minutes and as little as a few seconds. Alternative forming methods include the use of well known processes of cylinder forming and "dry laying" using carding or random fiber distribution.

UF resins are most commonly used as a binder for fiber glass mats because of their suitability for the applications and their relatively low cost. Melamine formaldehyde resins are sometimes used for higher temperature applications. To improve the toughness of the mats, a combination of higher mat tear strength and mat flexibility, which is needed to permit higher processing speeds on roofing product manufacturing lines and for maximum roofing product performance on the roofs, it is common to modify or plasticize the UF resins with acrylic latexes or SBR latexes. Meeting the tear strength requirements for asphaltic roofing composites or shingles can also be achieved by increasing the weight of the mat and/or asphalt in the shingle. Such methods however, are very costly.

U.S. Pat. No. 6,993,876 discloses the use of an adhesion modifier treated glass fiber mat in a roofing composite. The adhesion modifier can be a non-reactive polysiloxane.

Hundreds of millions of pounds of glass fiber mat have been made by the above known processes and have worked well. It is nevertheless desirable to simplify the mat process, to reduce costs and to improve the tear strength of roofing products still further. The present invention provides these advances in the industry.

SUMMARY OF THE INVENTION

The present invention provides a roofing product comprised of an asphalt coating on a nonwoven fiberglass mat. Enhanced tear strength for the roofing product, generally an asphalt shingle, is obtained by the presence of a release agent. The release agent can be a coating on the fiberglass mat, an additive in the mat binder, or present as an additive in the asphalt itself. The release agent can comprise a polysiloxane, lubricant, soap, or other surfactant.

In certain aspects, the present invention is based upon the discovery that the presence of a release agent anywhere within the roofing product, either the asphalt or the glass mat itself, can weaken the bonding between the asphalt coating and the reinforcing glass mat without detrimental impact on the other properties of the roofing product. It is believed that as a result, a portion of the energy involved in the actual tearing of the asphalt coated glass mat is dissipated in the coating/mat debonding process, and thus, the tear strength of the composite product is enhanced.

In one embodiment, a reactive polysiloxane is used as the release agent. The reactive polysiloxane can be anywhere within the roofing product, either the asphalt or the glass mat itself, and can enhance easily and without detrimental impact on the other properties of the roofing product, the tear strength of that product. The reactive polysiloxanes are polysiloxanes with hydroxyl functional groups, amino functional groups, epoxy functional groups, carboxyl functional groups, or phenol functional groups, either in the end groups or the side chains of the polymers. In a preferred embodiment, the functional groups are only at one or both ends of each polymer molecule. This allows reactivity but also lessens the impact that the particular polysiloxane may have with regard to the other properties of the roofing product.

DETAILED DESCRIPTION OF THE PREFERRED EMBODIMENTS

The glass fibers which can be used to make mats can have various fiber diameters and lengths dependent on the strength and other properties desired in the mat as is well known. It is preferred that the majority of the glass fibers have diameters in the range of 3 to 20 microns, most preferably about 12 to 17 microns. Normally the glass fibers used all have about the same target length, such as 0.75, 1 or 1.25 inch, but fibers of different lengths and diameters can also be used to get different characteristics in a known manner. Fibers up to about 3 inches in length can be used in a wet process for making fiber glass mats and even longer fibers can be used in some dry processes. Generally the longer the fiber, the higher the tensile strength of the mat, but the poorer the fiber dispersion in the mat formation. While E, T and C type glass fibers are preferred for use in this invention, other types or glass fibers are also suitable, like A type, S type, etc. While the majority of the fibers used in the present invention are glass fibers, a minor portion of non glass fibers can also be used, such as up to about 25 wt. percent organic fibers such as Nylon®, polyester, polyethylene, polypropylene, etc.

Processes for making nonwoven fiber glass mats are well known and some of them are described in U.S. Pat. Nos. 4,112,174, 4,681,802 and 4,810,576, which references are hereby incorporated into this disclosure by reference, but any known method of making nonwoven mats can be used. The preferred technique for the making of mats of the present invention is forming a dilute aqueous slurry of fibers and depositing the slurry onto an inclined moving screen forming wire to dewater the slurry and form a wet nonwoven fibrous mat, on machines like a Hydroformer® manufactured by Voith-Sulzer of Appleton, Wis., or a Deltaformer® manufactured by Valmet/Sandy Hill of Glenns Falls, N.Y. Next, the wet, unbonded mat is transferred to a second moving screen running through a binder application saturating station where the modified UF resin based binder in aqueous solution is applied to the mat. The excess binder is removed, and the wet mat is transferred to a moving oven belt where the unbonded, wet mat is dried and cured, polymerizing the UF based resin binder bonding the fibers together in the mat. Preferably, the aqueous binder solution is applied using a curtain coater or a dip and squeeze applicator. In the drying and curing oven the mat is subjected to temperatures of 250-450 or 500° F. for periods usually not exceeding 1 or 2 minutes and frequently less than 40 seconds. Alternative forming methods include the use of well known cylinder forming and "dry laying".

Any UF binder solution can be used. Preferred UF binders suitable for modification and use according to the present invention are commercially available, for example, from Georgia Pacific of Atlanta, Ga.

The release agents can comprise any suitable material which lessens the bond between the asphalt coating and the reinforcement mat, e.g. glass mat. Such release agents include surfactants, lubricants and soaps. Compounds such as polysiloxanes can also be used. The polysiloxanes can be reactive or non-reactive.

Reactive polysiloxanes include all polysiloxanes that react with any component of the roofing product. This includes the glass surface of the nonwoven fiberglass mat substrate, any sizing chemicals employed in preparing the glass mat, the binder chemicals and polymers used in binding the glass mat, e.g., urea-formaldehyde binders, and the asphalt coating applied to the glass mat to prepare the roofing product, e.g., a roofing shingle. Suitable polysiloxanes for use may be selected from among polyaklysiloxanes, polyarylsiloxanes, polyalkylarylsiloxanes and polyethersiloxane copolymers.

The reactive polysiloxanes are generally modified and are selected to contain reactive functional groups. Such polysiloxanes generally have hydroxyl functional groups, amino functional groups, epoxy functional groups, carboxyl functional groups or phenol functional groups, either in the end groups or the side chains of the polymers. Hydroxyl functional groups and amino functional groups are preferred. It is also preferred that the functional groups only exist as end groups on the polysiloxanes, with polydimethylsiloxanes being the most preferred polysiloxane having end groups which are hydroxyl functional groups or amino functional groups.

It is only important that the reactive polysiloxane react with any component within the roofing product. This provides flexibility in how the chemical is added to the roofing product while also providing a product with improved and enhanced tear strength. It also provides a product with improved tear strength while minimizing any other potential impact the presence of the polysiloxane might have on other properties of the roofing product.

The non-reactive polysiloxane can be any polymerized siloxane which does not react with a component of the roofing product. A preferred example is polydimethylsiloxane, with no added functional groups. In general, the non-reactive polysiloxanes will not comprise any reactive functional groups.

The polysiloxane may be applied in the form of a solution in water or an alcohol solvent, or as an emulsion. The application can be to the web, which application can take many different forms. The polysiloxane can be admixed with the binder solution so that the polysiloxane is applied during application of the binder to the glass fibers. The web can simply be coated or sprayed with a polysiloxane solution. Polysiloxane can be applied to the web either in the wet condition or after it has been dried or cured. Polysiloxane can also be added to the glass fiber sizing solution during fiber manufacture and web preparation. As well, the polysiloxane can be used as an additive in the asphalt coating to prepare the final roofing product.

Any surfactant which weakens the bond between the asphalt and the glass reinforcement can be used, whether cationic or anionic. Lubricants and soaps can also be used. Various waxes, oils, metal salts of fatty acids and fatty amines are examples of suitable surfactants.

The surfactant can be applied in the form of an aqueous solution in a solvent, or as an emulsion. The application can be to the web, which application can take many different forms. The glass web can simply be coated or sprayed with such a solution or emulsion. The surfactant or lubricant release agent can be admixed with the binder solution and applied therewith. The surfactant or lubricant release agent can also be added to the glass fiber sizing solution during fiber manufacture and/or web preparation. Or, the surfactant and lubricant release agent can be used as an additive in the asphalt used to prepare the final product.

Once the glass fiber mat has been prepared, the glass mat is coated on one or both sides with a conventional asphalt or asphalt compound. Optionally, roofing granules or backing sand can also be added. As described above, the release agent can be in any component of the roofing product. Once the asphalt has been applied to the glass mat, the finished product can be cut into the desired sizes, for example, as roofing shingles.

In addition to the higher tear performance produced by the present invention, the present invention also provides benefits of ease in preparation and handling. Only one modifier material, i.e., the release agent, must be added, and its flexibility allows its addition in any component of the roofing product. This reduces labor costs and chances of error when more complicated systems are used.

While the preferred embodiments of the invention have been disclosed in detail, other embodiments within the described invention and having other functional additives known or obvious to those skilled in the art are considered as part of the present invention and are intended to be included in the invention claimed below.

What is claimed is:

1. A roofing product comprised of an asphalt coating on at least one side of a cured glass fiber mat comprising glass fibers bonded together with a binder, with the roofing product comprising a polysiloxane release agent additive to the asphalt coating with the polysiloxane present only in the asphalt coating and with no polysiloxane in the glass mat, wherein the polysiloxane is a reactive polysiloxane which contains hydroxyl functional groups, amino functional groups, epoxy functional groups, carboxyl functional groups or phenol functional groups.

2. The roofing product of claim 1, wherein the roofing product is a roofing shingle.

3. The roofing product of claim 1, wherein the release agent is the polysiloxane which is a polyalkylsiloxane, a polyarylsiloxane, a polyalkylarylsiloxane or a polyethersiloxane or derivative thereof.

4. The roofing product of claim 2, wherein said polysiloxane is a polydimethylsiloxane or derivative thereof.

5. The roofing product of claim 1, wherein the binder is a urea-formaldehyde binder.

6. The roofing product of claim 1, wherein the functional groups are present as end groups of the polysiloxane.

7. The roofing product of claim 5, wherein the functional groups are present as side chains of the polysiloxane.

* * * * *